(No Model.)

C. W. HOLTZER.
GALVANIC BATTERY.

No. 496,878. Patented May 9, 1893.

Witnesses
Jas. J. Maloney
H. E. Hill

Inventor
Charles W. Holtzer
by Jos. P. Livermore
Att'y

UNITED STATES PATENT OFFICE.

CHARLES W. HOLTZER, OF BROOKLINE, MASSACHUSETTS.

GALVANIC BATTERY.

SPECIFICATION forming part of Letters Patent No. 496,878, dated May 9, 1893.

Application filed November 14, 1891. Serial No. 411,903. (No model.)

*To all whom it may concern:*

Be it known that I, CHARLES W. HOLTZER, of Brookline, county of Norfolk, State of Massachusetts, have invented an Improvement in Galvanic Batteries, of which the following description, in connection with the accompanying drawings, is a specification, like letters on the drawings representing like parts.

My invention relates to a galvanic battery and consists mainly in a novel construction and arrangement of the elements of the battery by which greater efficiency and convenience in repairing or replenishing the battery are attained.

In batteries having zinc and carbon as the positive and negative elements there is variation in the size and arrangement of the zinc element according to the work that a battery is to perform. For some batteries a low resistance is required in which case a hollow zinc cylinder having a large surface is commonly used as the positive element, while for high resistance batteries a slender stick or rod of zinc is used, and commonly the construction of the battery is such that only the form of zinc for which the battery is designed can be used with it, so that if for example the zinc cylinder of a low resistance battery becomes exhausted the said battery cannot be renewed by supplying the zinc rod of the high resistance battery, and similarly, a high resistance battery cannot be renewed by supplying one of the zinc cylinders commonly used in low resistance batteries.

The present invention consists mainly in a construction and arrangement of the parts that co-operate with the elements to support them in the jar or vessel containing the exciting fluid of the battery, in such manner that the large surfaced or small surfaced zinc pieces may be used interchangeably so that if the zinc of either kind that has been used in the battery becomes exhausted the battery can be renewed by supplying a zinc of the other kind if need be and will operate until a zinc of the desired kind can be supplied.

Figure 1:
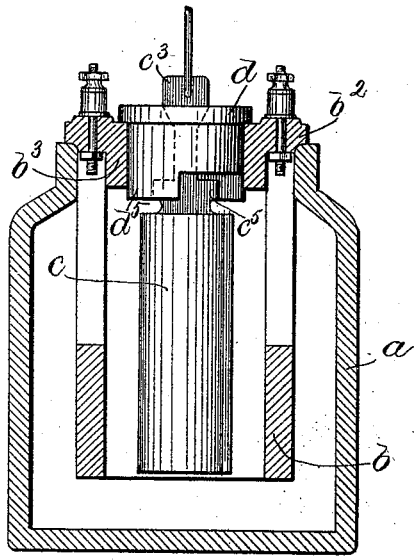
Figure 2:
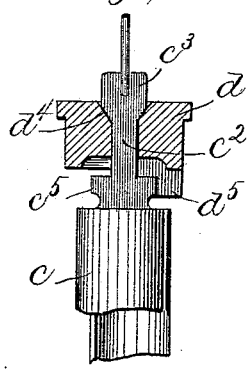
Figure 3:
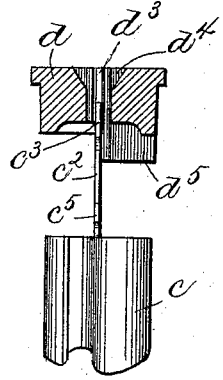
Figure 4:
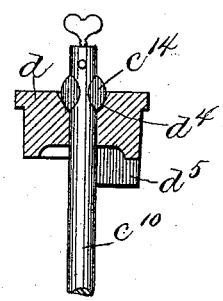
Figure 5:
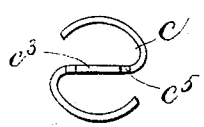
Figure 6:
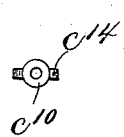

Figure 1 is a vertical section of a battery cell embodying this invention having a large surfaced zinc in working position, to cause the battery to work as a low resistance battery, the stopper or cap piece of the battery in which the zinc is supported being shown in elevation; Figs. 2 and 3 sectional details of the cap or stopper illustrating the mode of engaging the large surfaced zinc therewith; Fig. 4 a similar view showing the small surfaced zinc rod in working position; Figs. 5 and 6 end elevations of the large surfaced and small surfaced zincs, respectively, and Fig. 7 an under side view of the supporting stopper.

The outer jar $a$ may be of the usual construction, and contains within it the negative element $b$ which may be a hollow cylinder of carbon or of an agglomerate of carbon, and peroxide of manganese, or any other material commonly used for the negative element of a battery of this class, the said element $b$ being shown in this instance as provided at its upper end with a flange or shoulder $b^2$ that rests on the top of the jar $a$ to support the said negative element in the jar, this construction being the same as that shown in Patent No. 327,878, granted to me October 6, 1885, and not being herein claimed.

The cylinder $b$ is shown as having its wall thickened at the inside near its upper end forming an inwardly projecting flange or shoulder $b^3$ the end of the cylinder being however provided with an opening within the said shoulder, which opening is of slightly smaller diameter than the inner bore of the cylinder $b$ but is of sufficiently large size to admit a negative element $c$ the outside diameter of which is but slightly smaller than the inside diameter of the cylinder $b$ so that the surfaces of the two elements stand very near one another and the exciting liquid between them affords but little resistance to the current.

The exciting fluid may be of any usual kind, as for example a solution of ammonium chloride, such as commonly used in the well known Leclanché batteries, and when the battery is to be used as a low resistance battery the positive or zinc element has a large surface as shown in Figs. 1, 2, 3, and 5, being preferably composed of a sheet of strip zinc bent to the S-shaped form best shown in Fig. 5, so that it has a large surface exposed to the exciting fluid and in close proximity to the surface of the element $b$ thus producing the effect of the hollow zinc cylinders commonly used in low resistance batteries of this general type.

In order to provide for the proper support of the zinc $c$ in the battery, a removable insulating cap or stopper $d$ is provided which fits the openings in the upper part of the cylinder $b$ as shown in Fig. 1, and together with the upper part of the cylinder forms a top or cover for the battery cell. The stopper $d$ is provided with a central axial bore $d^2$ as best shown in Fig. 7, of a diameter equal to that of the zinc rod $c^{10}$, such as commonly employed in high resistance batteries of the Leclanché type, and at the sides of the said bore longitudinal grooves $d^3$ are formed wholly through the stopper, and at right angles to said grooves, notches $d^4$ are formed in the upper part of the bore as best shown in Figs. 2, 3, and 4.

The stopper with the notched and grooved bore just described co-operates with the low resistance zincs $c$ and high resistance zincs $c^{10}$, as will now be described.

The large surfaced zincs $c$ are provided with a neck $c^2$ the upper end of which is widened or provided with a head or enlargement $c^3$ the width of which head is equal to the distance between the notches $d^3$ in the cap piece $d$ while the neck $c^2$ is of a width equal to the diameter of the opening $d^2$ in said cap piece $d$. Thus the neck of the zinc can be passed through the opening in the stopper from below by having the head $c^3$ in line with the notches $d^3$ as shown in Fig. 3, and after the head $c^3$ has been passed wholly through so as to be wholly above the top of the cap piece, the zinc can be given a quarter turn, the neck $c^2$ turning in the opening $d^2$ of the cap and thus bringing the head $c^3$ in line with the notches $d^4$ of the cap, into which the head is then dropped as shown in Fig. 2, so that the zinc is securely held in the said cap piece.

Figure 7:
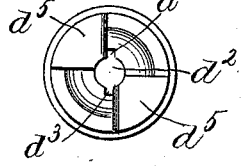

In order to facilitate the operation of introducing the zinc, and to contribute to its firm support when introduced, the cap piece $d$ is provided at its under side, with projections $d^5$ each occupying about one quarter of the space around the cap piece as best shown in Fig. 7, and below the reduced neck $c^2$ of the zinc, and the supporting strip above the body of the zinc is widened forming shoulders $c^5$ see Fig. 2, which bring up against the projections $d^5$ limiting the turning of the neck $c^2$ in the opening $d^2$ to an amount sufficient to bring the head in line with the grooves or notches of the cap piece. The high resistance zinc rods $c^{10}$, are provided with laterally projecting fins $c^{14}$, which enter the notches $d^4$ in the cap piece $d$ and thus support the said zinc rods as shown in Fig. 4.

It is not essential that the large surfaced zincs should be made in a specific shape illustrated, although the shape shown is easy to produce, and a zinc element so shaped works efficiently in the battery. It is necessary only, however, that the zinc should have a large surface exposed to the solution in the battery and in close proximity to the surface of the other element of the battery. It is also not essential that the top or cover of the battery should be made in part integral with the negative or carbon element of the battery, although such construction is believed to be the best.

It is essential only that the top or cover of the battery should have an opening sufficiently large to admit of the large surfaced zinc being passed through, and a cap piece or stopper for said opening adapted to receive and support securely a zinc of that character, or to support a slender rod of zinc.

The engagement between the cap, and zinc is such that the latter is held securely in position concentric with the element $b$ and cannot possibly be thrown out of its concentric position so as to make contact with said element and short circuit the battery, or so as to produce an uneven electrolytic action.

With a battery of this kind if one of the zincs becomes exhausted and the person desiring to renew the battery has only one of the low resistance zincs, that can be introduced by removing the cap $d$ from the top or cover of the battery, inserting the neck of the zinc from below as shown in Fig. 3, and then turning it to the position shown in Fig. 2, when the zinc can be lowered into the battery through the opening in the cover, and the supporting cap $d$ inserted tightly in the top or cover of the battery. The battery will then operate with the larger surfaced zinc, even although it is intended to be used with one of the zinc rods $c^{10}$, which of course can be placed in the battery and would have been if the operator were provided with one, or on the other hand, if the battery is intended to be used with one of the large zincs and the person desiring to replenish it has only one of the small zinc rods, the latter can be introduced and used until the proper zinc can be supplied. This interchangeability of the zincs is of great importance as it frequently happens that the batteries fail, and an inspector calls provided with only a zinc of different kind from the one used in the battery, in which case in the batteries heretofore made, such a zinc as the inspector may have cannot be used, and the battery is rendered wholly inoperative until the proper zinc can be obtained.

The large surfaced or low resistance zincs $c$ of the kind herein shown can be produced at very low cost by stamping a blank from sheet zinc having the body and neck portion and then bending the body portion so as to bring it into the proper compass to pass through the opening in the top of the battery, while affording a large surface to be exposed to the exciting fluid in the battery.

I claim—

1. A galvanic battery consisting of an outer jar or vessel and hollow element therein, the top of said jar being provided with a large opening over the hollow element, combined with a removable cap piece or stopper fitted to said opening and provided with a longitudinal passage grooved at its sides as described; and the positive element having its upper portion or neck extended through the said passage in the stopper and being provided with outward projections from said neck, whereby the said element may be engaged with the said stopper and introduced through the opening in the top of the battery, substantially as described.

2. The combination of the top or cover of a galvanic battery provided with an opening, with a removable cap or stopper for said opening, provided with a longitudinal passage grooved at its side as described, and a zinc having a supporting neck and enlargement above the said neck capable of passing through the said grooved passage and adapted to be supported by the said stopper when the enlargement of the neck is out of line with the groove of the passage, substantially as, described.

3. The removable cap or stopper for the top of a galvanic battery provided with a longitudinal passage and grooves and notches adjoining said passage as described, combined with a positive element having its upper part adapted to extend through the said passage of the stopper and provided with projections to engage with the notches thereof, substantially as described.

4. The stopper or removable cap for the top of a galvanic battery provided with a central passage $d^2$, and grooves $d^3$ and notches $d^4$ adjoining the same as described, and with projections $d^5$ combined with a zinc element having a neck portion and enlargements above and below the same, as $c^3, c^5$, cooperating with the said stopper, substantially as described.

5. The herein described zinc element for galvanic batteries composed of sheet zinc having a body and a supporting neck $c^2$ provided with an enlargement or widened portion $c^3$ integral therewith, the said body being bent to present a substantially cylindrical surface to the exciting fluid in juxtaposition to the cooperating element of the battery, substantially as described.

In testimony whereof I have signed my name to this specification in the presence of two subscribing witnesses.

CHARLES W. HOLTZER.

Witnesses:
 JOS. P. LIVERMORE,
 M. E. HILL.